E. D. WATERBURY.

CAN SEALING AND OPENING DEVICE.

APPLICATION FILED JUNE 11, 1913.

Reissued Mar. 31, 1914. 13,709.

Witnesses

Otto E. Hoddick.

L. E. Petersen.

Inventor

E. D. Waterbury.

By N. J. O'Brien

Attorney

COLUMBIA PLANOGRAPH CO., WASHINGTON, D. C.

UNITED STATES PATENT OFFICE.

EMERY D. WATERBURY, OF SAWTELLE, CALIFORNIA, ASSIGNOR OF ONE-HALF TO MARTIN LINTNER, OF NAPA, CALIFORNIA.

CAN SEALING AND OPENING DEVICE.

13,709. Specification of Reissued Letters Patent. Reissued Mar. 31, 1914.

Original No. 999,612, dated August 1, 1911, Serial No. 590,048. Application for reissue filed June 11, 1913. Serial No. 773,136.

*To all whom it may concern:*

Be it known that I, EMERY D. WATERBURY, a citizen of the United States, residing at Sawtelle, in the county of Los Angeles and State of California, have invented certain new and useful Improvements in Can Sealing and Opening Devices; and I do declare the following to be a full, clear, and exact description of the invention, such as will enable others skilled in the art to which it appertains to make and use the same, reference being made to the accompanying drawings, and to the characters of reference marked thereon, which form a part of this specification.

My invention relates to a device for opening and sealing cans containing condensed milk or other substance in liquid form, or sufficiently mobile to readily pour through a small opening when the can is properly vented; and the object of the invention is to provide a simple device of economical construction, by which the contents of the can may be protected against the deteriorating action of the air. It is well known that liquid or semiliquid substances, such as condensed milk, are generally used in small quantities and at varying intervals and my improved device is adapted to make it practicable to open these cans, both for pouring and venting purposes and as soon as the desired portion of the contents has been removed, to seal the can by the use of the same instrument that formed the pouring and venting punctures.

A further object of the invention is to provide a device which may be easily and readily manipulated and whose use requires no special skill.

These stated objects and such other incidental objects as will hereinafter appear, are obtained by the use of the device illustrated in the accompanying drawings, and the invention consists in certain novel features of the same which will be hereinafter first fully described and then more particularly pointed out in the appended claims.

Figure 1:
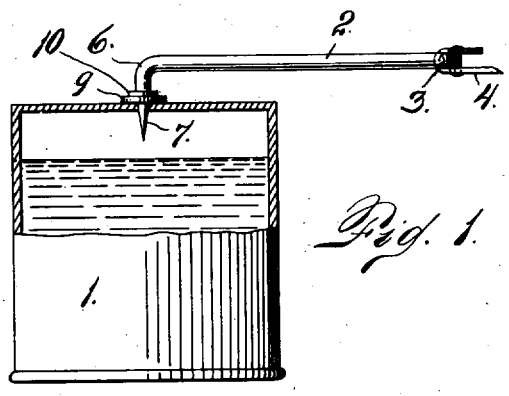
Figure 3:
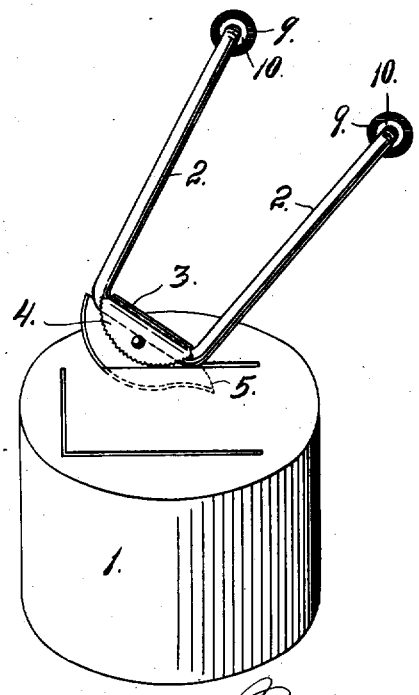
Figure 2:
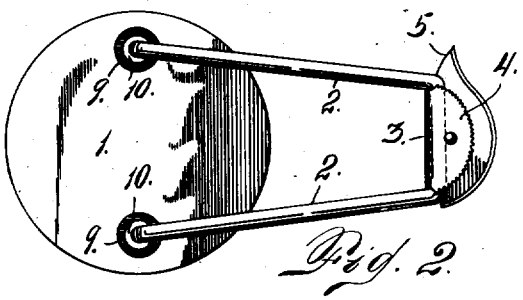
Figure 4:
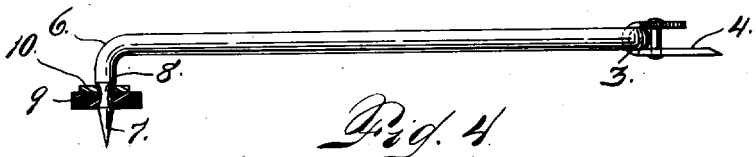
Figure 6:
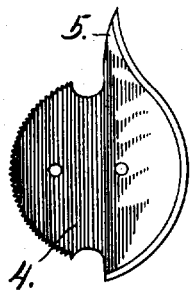
Figure 5:
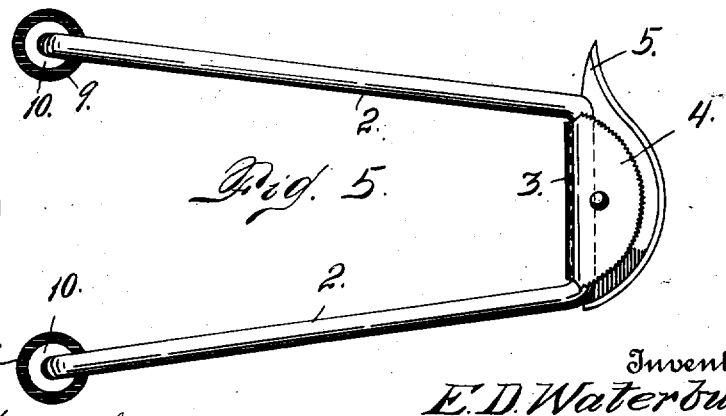

In the accompanying drawings—Figure 1 is a sectional elevation showing my device applied to a can. Fig. 2 is a top plan view of the same. Fig. 3 is a perspective view showing the manner of using the tool as an ordinary can-opener, the can-cutting feature in this instance being independent of the main feature of the device heretofore outlined and adapted to perform both the can-opening and can-sealing functions. Fig. 4 is a detail side elevation of the device, the washers, however, applied to one of the pointed extremities being shown in section and on a larger scale. Fig. 5 is a top plan view of the tool, shown on the same scale as in Fig. 5. Fig. 6 is a detail view of the blank from which the cutter is formed, and shown on the same scale as in Figs. 4 and 5.

The same reference characters indicate the same parts in all the views.

Let the numeral 1 designate a can of the usual or any preferred construction, which is normally hermetically sealed at its top and bottom. My improved opening and sealing tool comprises a pair of resilient or spring arms 2, which are connected at their outer ends by an integral transverse member 3, forming a substantially U-shaped structure as clearly shown in the drawings. A metallic plate 4 is folded over and rigidly secured to this transverse member and is provided at one end with a point or blade 5, which may be forced through the top of a can in order to start an incision therein for cutting out the top of the can or a portion thereof in the usual manner. The convex edge of this blade constitutes a knife for the aforesaid purpose, the tool being rocked, as will be readily understood.

The free ends of the spring arms 2, as illustrated in the drawing, are turned downward, as shown at 6, and the extremities of said ends are tapered, as shown at 7, so as to form sharpened extremities which may be termed spurs or brads adapted to readily pass through the top of a can containing condensed milk, for instance as shown in Fig. 1. Just above the tapered portions of these downturned ends, I provide annular grooves or recesses 8, in which are fitted washers 9 and 10, the washer 9 being preferably of rubber, or some similar or suitable elastic or yielding material, while the washer 10 is composed of metal or other rigid material and preferably of less diameter than the washer 9. The smaller rigid washer is placed on the end of the tool first and moved upwardly to the position shown in Fig. 4, after which the washer 9 is applied, being shoved upwardly over the tapered point until it engages the groove or recess 8 and is in contact with the washer 10, which engages the upper surface of the washer 9 and locks the latter in place against further upward movement.

The use of the device will, it is thought, be readily understood from the foregoing description taken in connection with the accompanying drawings. The extremities of the arms provided with the pointed end 7 may be moved laterally so that the tapered extremities thereof will rest upon the can near the extreme edge thereof at diametrically or approximately diametrically opposite points; a sufficient force is then applied to the tool to force the tapered extremities through the can top and bring the washers 10 into intimate contact with the upper surface of the said top. The resilience of the arms 2 will bind the points tightly within the punctures formed thereby so that they will not readily slip from the said punctures; and the elastic washers fitting closely over these punctures will effectually prevent the access of air or dirt to the contents of the can. When it is desired to remove some of the contents of the can, a slight lifting force is applied to the spring arms so as to remove the same from the punctures in which they are seated, and the milk may then be poured through one of the said punctures, while the air enters through the other puncture which forms a vent for the can, as will be readily understood. When it is desired to again seal the contents of the can, the arms are moved laterally sufficiently to cause their free ends to register with the punctures, after which the tapered ends or points may be easily forced into the punctures, whereby they are caused to perform the sealing function aided by the resilience of the arms acting laterally at right angles to the axes of the points and whereby the edges of the can around the punctures are caused to enter or engage the recesses or grooves 8, causing the device to be securely and automatically retained in place for the aforesaid purpose.

My device is obviously simple in its construction and may be manufactured and placed on the market at small cost. It will be found highly efficient for the purpose for which it is designed and may be easily manipulated by any unskilled person so that the purity of the milk or other material constituting the contents of the can may be preserved for an indefinite period.

It should be remembered that the all-important feature of the device consists of the resilient arms which perform the double function of affording manipulating handles while their resilience as soon as the force applied for imparting lateral movement is removed, serves to retain the device securely in place in the sealing position, since the recoil action of the arms, when released, acts at right angles or approximately at right angles to the axes of the points, thus producing the result of binding the tapered points within the can top. This action of the spring arms further causes the edges of the can top around or adjacent the punctures to engage or enter the grooves 8 above the tapered points, which grooves coöperate with the binding action of the arms to perform the retaining function. It will also be observed that the spring arms extend beyond the can so that they may be easily grasped by the user and may be utilized as a lever against the edge of the can to facilitate the removal of the spurs or tapered ends from the punctures.

Various changes in the form, proportion and the details of construction may be resorted to without departing from the principle or sacrificing any of the advantages of the invention, as defined in the appended claims.

I claim:—

1. A device of the class described, comprising spring arms connected at their outer extremities and arranged, when in use, above the top of the can, the said arms being spaced apart at their opposite extremities and equipped with pointed members adapted to pierce a can top, the separated extremities of the arms being adapted to be moved laterally to bring the piercing members in the proper position with reference to the outer edge of the can and free to recoil when released, which action serves to perform the retaining function when it is desired to seal the can, substantially as described.

2. A tool for the purpose set forth, comprising a pair of divergent, resilient arms adapted to extend over the top of a can and project laterally beyond the same and having down-turned tapered ends adapted to pierce and pass through said top, and sealing devices carried by said down-turned ends.

In testimony whereof, I affix my signature in the presence of two witnesses.

EMERY D. WATERBURY.

Witnesses:
A. J. O'Brien,
C. M. Waudby.

Copies of this patent may be obtained for five cents each, by addressing the "Commissioner of Patents, Washington, D. C."